United States Patent
Dunson et al.

[11] Patent Number: 6,024,818
[45] Date of Patent: Feb. 15, 2000

[54] RIGID FIBER COMPOSITE

[76] Inventors: Samuel Eugene Dunson, 322 W. Yorktown Dr.; Stafford Reade Brooke, III, 968 Old School Rd., both of LaGrange, Ga. 30240

[21] Appl. No.: 07/994,072

[22] Filed: Dec. 21, 1992

Related U.S. Application Data

[63] Continuation of application No. 07/592,422, Oct. 3, 1990, abandoned.

[51] Int. Cl.[7] .............................. B32B 31/26; B32B 5/06
[52] U.S. Cl. ..................... 156/148; 28/112; 156/308.2; 442/388; 442/403
[58] Field of Search ................... 156/148, 309.6; 428/300, 234, 235; 28/112, 107; 442/388, 403

[56] References Cited

U.S. PATENT DOCUMENTS

| | | | |
|---|---|---|---|
| 3,558,412 | 1/1971 | Kurz | 156/309.6 |
| 4,126,499 | 11/1978 | Payen | 156/148 |
| 4,199,635 | 4/1980 | Parker | 428/95 |
| 4,205,113 | 5/1980 | Hermannson et al. | 28/112 |
| 4,258,093 | 3/1981 | Benedyk | 428/85 |
| 4,373,001 | 2/1983 | Smith et al. | 428/212 |
| 4,416,936 | 11/1983 | Erickson et al. | 156/148 |
| 4,432,822 | 2/1984 | Adams et al. | 156/148 |
| 4,445,954 | 5/1984 | Adams et al. | 156/148 |
| 4,542,060 | 9/1985 | Yoshida et al. | 28/112 |
| 4,568,581 | 2/1986 | Peoples, Jr. | 428/300 |
| 4,726,987 | 2/1988 | Trask et al. | 28/107 |
| 4,766,029 | 8/1988 | Brock et al. | 428/286 |
| 4,892,780 | 1/1990 | Cochran et al. | 428/300 |
| 4,925,729 | 5/1990 | O'Connor | 156/148 |
| 4,935,295 | 6/1990 | Serafini | 156/148 |
| 4,971,642 | 11/1990 | Schwan | 156/148 |
| 5,080,951 | 1/1992 | Guthrie | 428/300 |

FOREIGN PATENT DOCUMENTS

| | | | |
|---|---|---|---|
| 004717 | 4/1976 | Japan | 156/148 |
| 3159563 | 7/1988 | Japan | 156/148 |

*Primary Examiner*—Daniel Stemmer
*Attorney, Agent, or Firm*—Terry T. Moyer; George M. Fisher

[57] ABSTRACT

A method for manufacturing a rigid fiber composite material and the product thereof created by needling a composite of a non-woven blend of first fibers with a initial melting point with one or more other fibers with higher melting points that are interposed between two interentangled non-woven layers of the first fibers and then heating this composite to a level above the melting point of the first fibers forming a plasticized structure.

23 Claims, 4 Drawing Sheets

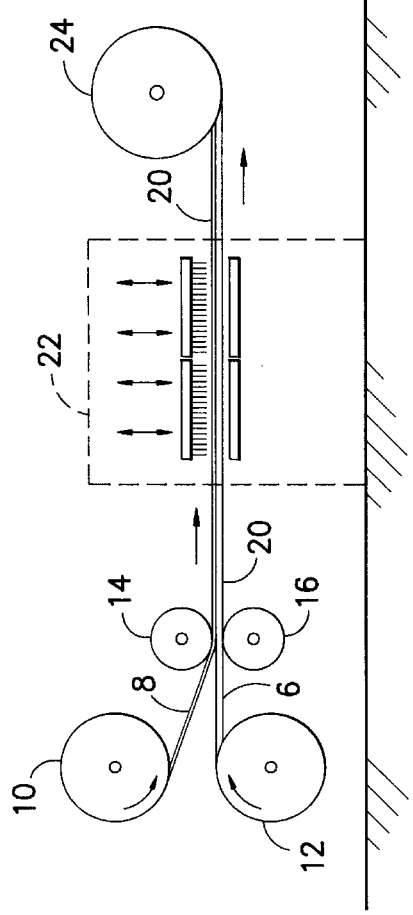
FIG. -1-
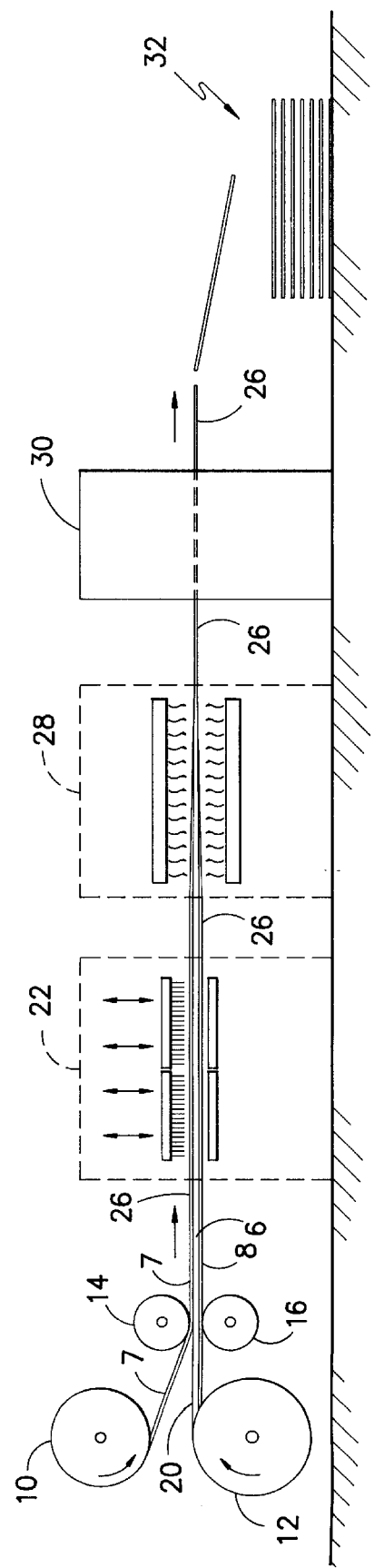
FIG. -2-

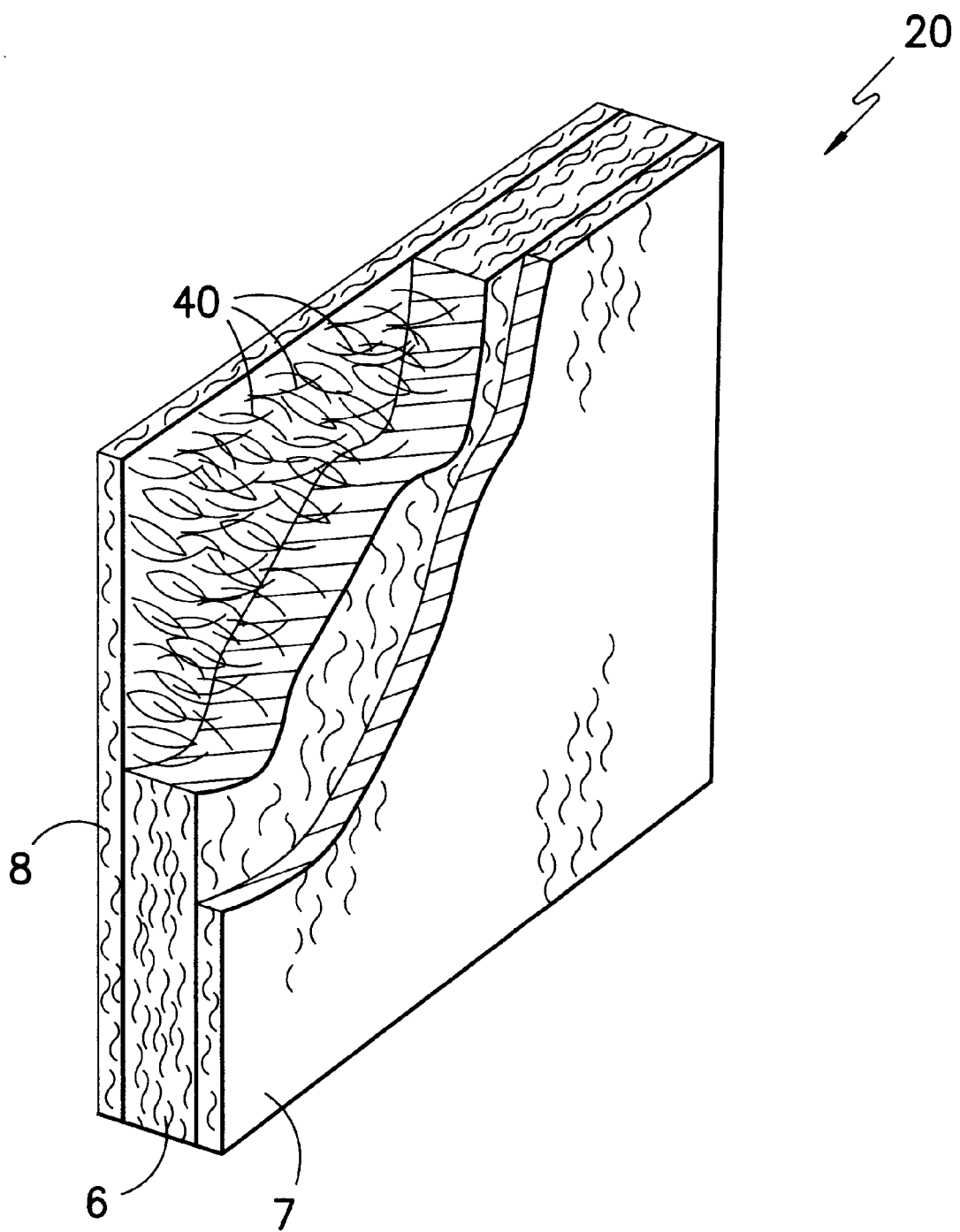
FIG. —3—

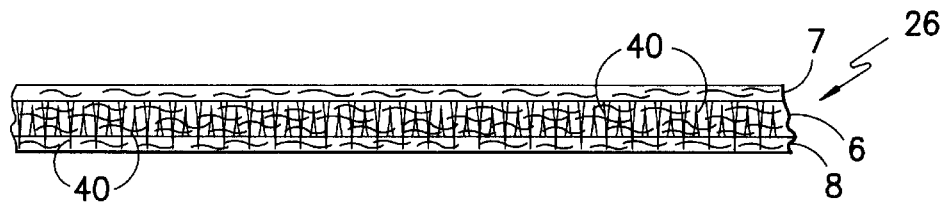
FIG. -4-
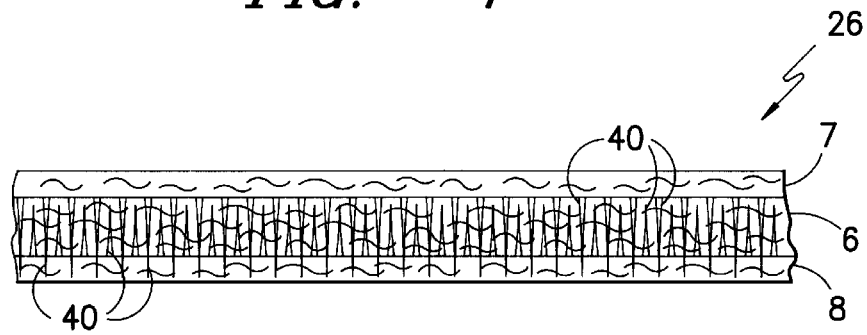
FIG. -5-
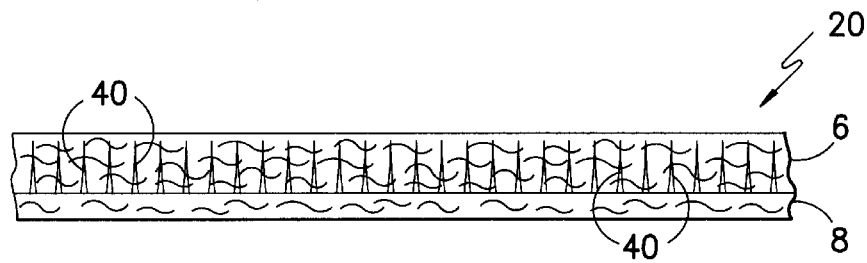
FIG. -6-
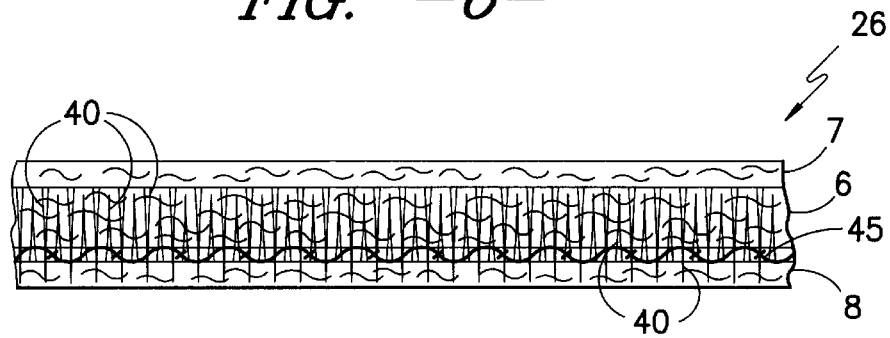
FIG. -7-
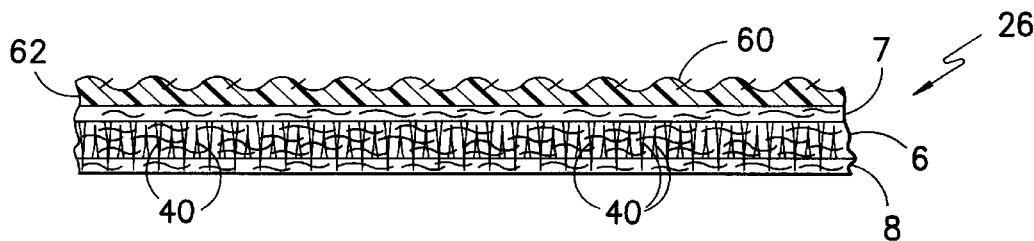
FIG. -8-

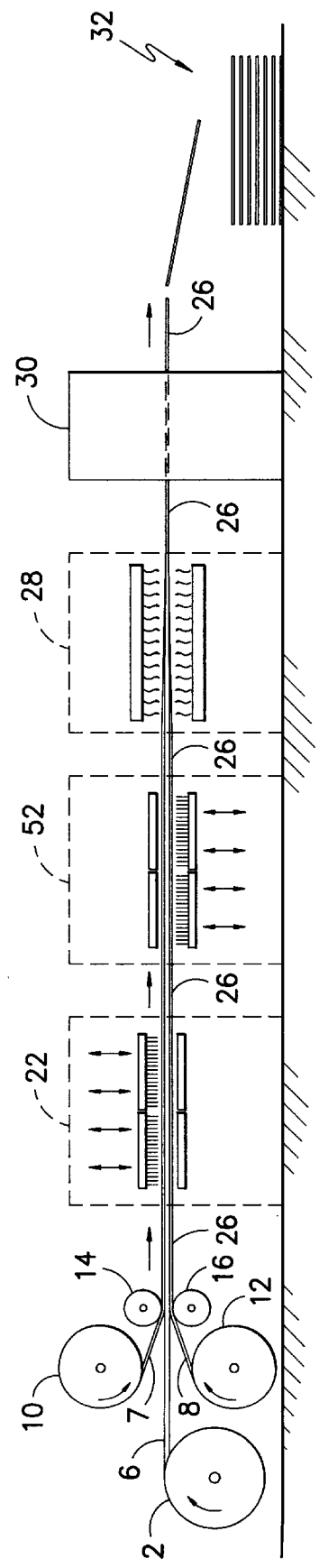
FIG. −9−

RIGID FIBER COMPOSITE

This application is a continuation of U.S. patent application Ser. No. 07/592,422, filed Oct. 3, 1990, now abandoned.

BACKGROUND OF THE INVENTION

This invention relates to a process for forming a rigid fiber composite and the product thereof.

There are a number of composites that utilize fibers. Some of them rely on a melt-blown process in combination with calendering such as U.S. Pat. No. 4,766,029. Others like U.S. Pat. No. 4,373,001 require the outer layers to be woven or knitted or some like U.S. Pat. No. 4,258,093 do not even have outer layers or a blend of fibers such as U.S. Pat. No. 4,199,635. Furthermore, there are a number of composites that require molding under pressure such as U.S. Pat. No. 4,432,822 and U.S. Pat. No. 4,445,954.

In summary, the present substitutes for wood can lack flexibility, strength or require extensive processing such as molding, heat setting or calendering. The present invention solves this problem in a manner not disclosed in the known prior art.

SUMMARY OF THE INVENTION

A method for manufacturing a rigid fiber composite material and the product thereof created by needling a composite of a non-woven blend of first fibers with an initial melting point with one or more other fibers with a higher melting point(s) that is interposed between two interentangled, non-woven layers of the first fibers and then heating this composite to a level above the melting point of the first fibers.

An advantage of this invention is that the fiber composite has more flexibility than wood with respect to pressure.

A further advantage of this invention is that the fiber composite can absorb sound at a level several times better than wood.

It is another advantage of this invention is that the thermal resistance of the fiber composite is two and one-half times that of wood.

It is still another advantage of this invention is that the main portion of this fiber composite can consist of waste fibers that results in an economical end product.

Yet another advantage of this invention is that the composite is melted and plasticized and not merely heat set.

In an another advantage of this invention is that an outer decorative fabric layer can be easily flame-laminated onto the composite.

BRIEF DESCRIPTION OF THE DRAWINGS

The above as well as other objects of the invention will become more apparent from the following detailed description of the preferred embodiments of the invention, which when taken together with the accompanying drawings, in which:

FIG. 1 is a schematic side elevation view of apparatus for combining and needling a first interentangled layer of first fibers with an initial melting point with a blend of the first fibers and fibers of a higher melting point(s);

FIG. 2 is a schematic side elevation view of apparatus for combining and needling a second interentangled layer of first fibers with an initial melting point with the end product of the process of FIG. 1;

FIG. 3 is a cut-away perspective view of the fiber composite exposing all three layers with fibers from both the top and bottom layers needled therethrough;

FIG. 4 is a cross-sectional view of the fiber composite of the present invention after heat treatment;

FIG. 5 is a cross-sectional view of the fiber composite of the present invention before heat treatment;

FIG. 6 is a cross-sectional view of the fiber composite of the present invention prior to attachment of the interentangled upper fibers layer;

FIG. 7 is a cross-sectional view of the fiber composite of the present invention with the fiber blend mounted on a woven fabric;

FIG. 8 is a cross-sectional view of the fiber composite of the present invention with a decorative fabric layer flame-laminated to the upper layer; and FIG. 9 is a schematic side elevation view of apparatus for combining and needling a first and second interentangled layer of first fibers with an initial melting point with a blend of the first fibers and fibers of a higher melting point(s).

DETAILED DESCRIPTION OF THE PREFERRED EMBODIMENT

Referring more specifically to the drawings, FIGS. 1 and 2 show, diagrammatically, an overall side elevational view of apparatus for creating a rigid fiber composite. As shown in FIG. 1, a first roll 10 of interentangled, non-woven, non-knitted, one hundred percent polypropylene fibers 8 is combined with a second roll 12 of a fiber blend of nylon and polypropylene 6 by means of a pair of drive rolls 14 and 16 that transports the combination 20 of the interentangled polypropylene fibers 8 and nylon and polypropylene blend 6. The interentangled polypropylene fiber 8 can be a variety of sizes, with the optimal being between 6 to 17 denier. The entire thickness of the combination 20 can vary widely depending on the particular application. There are a number of lower melting point materials such as polyethylene that can be substituted for polypropylene. As a substitute for nylon, any material of a second higher melting point will suffice. This can include polyester, cotton, fiberglass, modacrylic and so forth. There can be any number of fibers used in the blend. The blend will still provide for an overall rigid fiber composite with as little as 10 percent of the lower melting point fibers, such as polypropylene, in the blend. For economy, the blend fibers can be scrap fibers from other manufacturing operations. The polypropylene has a melting point of approximately 325 to 340 degrees Fahrenheit.

Another optional means of combining the blend of fibers for use in this process is to needle them onto a one hundred percent polypropylene scrim 45, as shown in FIG. 7, that is a woven structure of approximately 2.5 ounces per square yard. This provides for ease of processing and transporting.

The combination 20 is then processed through a standard needle loom 22. A needle loom 22 is well known in the art as described in U.S. Pat. No. 4,258,0939 which is incorporated herein by reference. This needling process drives elongate pieces 40 of the interentangled, one hundred percent polypropylene fibers 8 into the polypropylene and nylon blend 6 as shown in FIG. 6. These needles can range in size between 0.638 millimeters and 2.11 millimeters in diameter while the preferred size is 0.858 millimeters in diameter. The length of the needle can vary depending on the thickness of the composite. The needles are spaced apart at 4,266 needles/meter. This factor can also vary widely depending on the strength of the final result desired. The combination 20 can pass through the needle loom 22 at a variety of speeds with the optimal being 3.64 meters a minute. The combination 20 is then collected in a continuous manner on a take-up roll 24.

Referring now to FIG. 2, the entire process described above is repeated with the needled combination 20 on the second roll 12 with an additional roll of interentangled one hundred percent polypropylene fibers 7 mounted on first roll 10. The combination 20 and the interentangled one hundred percent polypropylene fibers 7 are placed adjacent to each other and form a final composite 26 that is transported by means of drive rolls 14 and 16. This final composite 26 has a blend of polypropylene and nylon fibers 6 in between a layer of one hundred percent polypropylene fibers on both the top 7 and on the bottom 8.

Final composite 26 is also passed through the needle loom 22 performing the same operation as before, only this time, elongate pieces 40 of interentangled polypropylene fibers from layer 7 are driven into the blend of polypropylene and nylon 6 as well as the other interentangled one hundred percent polypropylene fibers 8 as shown in FIG. 5. This is shown in greater detail in FIG. 3 which is a cut-away perspective view showing all three layers and the needled pieces 40 of polypropylene extending through the layers.

This needled final composite 26 then passes through an oven 28. This oven 28 may be heated by any conventional method including, conduction, convection or radiation. The preferred method is natural gas convection heating. The temperature will generally range from about 375 to 425 degrees Fahrenheit and more usually within 380 to 400 degrees Fahrenheit. This heating process results in the melting of the polypropylene which then cools and hardens as opposed to mere heat-setting or softening. Therefore, the outer layers 8, 7 as well as the elongate pieces 40 that extend throughout the depth of the composite 26 are solidified to the extent that the entire structure now has the rigidity of wood. The structure also shrinks by approximately 35 to 40 percent as shown in FIG. 4. The composite 26 travels through the oven 28 at a rate of 6.37 meters a minute at 380 degrees Fahrenheit or 8.19 meters a minute at 400 degrees Fahrenheit. If the composite is subjected to excessive heat for a prolonged period, the outer interentangled layers will melt off. If there is not enough heat, the composite will not plasticize to achieve rigidity. There can be numerous zones in the oven with the last ones being at a much lower temperature such as 150 to 200 degrees Fahrenheit. This will allow the composite 26 to solidify and cool before further processing. Each zone can be 3.4125 meters long for an oven 28 having eight zones.

The composite 26 is now cut into pieces by means of a die cutter 30. The composite 26 can be cut by any means including water jet, laser or saw. The pieces of hardened fiber composite 26 can then be stacked in a pile 32.

In the alternative, the optimal method as shown in FIG. 9, is to combine the interentangled, non-woven, one hundred percent polypropylene fibers 7 and place it on an upper roll 10 and the blend of nylon and polypropylene fibers 6 on a middle roll 2 and place another roll of interentangled, non-woven, one hundred percent polypropylene fibers 8 on a lower roll 12 and combine and transport them, as before, by means of drive rolls 14 and 16.

The composite 26 is then needled from one direction by needle loom 22. However, it will not be as strong when hardened, because there are only half as many elongate pieces 40 of polypropylene fibers extending through the cross-section of the composite 26. Therefore, the composite 26 can then, optionally, be transported through another needle loom 52 that needles the fabric from the bottom of the composite 26 to the top. The operation is then the same, with composite 26 heated in oven 28 and then cut by the die cutter 30 before being stacked in pile 32.

The hardened needled composite 26 has 2 to 3 times the sound absorbing properties of wood and 2.5 times the thermal resistance of wood. Furthermore, the composite 26 passes the FMVSS (Federal Motor Vehicle Safety Standard) § 302 for flame resistance. The inside of composite 26 forms a hardened honeycomb structure.

In the alternative embodiment, fabric or other fibrous material 60 can be flame laminated to the outside of the hardened needled composite 26 as shown in FIG. 8 for decorative purposes. The fabric can be a raschel knit fabric and it can be mounted on a foam backing 62 such as polyether.

EXAMPLE 1

As shown in FIG. 1, a roll 10 of one hundred percent polypropylene that is an interentangled, non-woven, non-knitted fiber layer 8 of 6 denier, 6 ounces per square yard, 0.0625 inches thick with 3 to 4 inch fiber length and is combined by means of drive rolls 14 and 16 with a non-woven blend of 80% nylon and 20% polypropylene fibers 6 on roll 12 which is 0.25 inches thick that was previously needled upon a 100% polypropylene scrim 45 which was woven to form a mesh. This scrim 45 weighs 2.5 ounces per square yard. This combination 20 is needled by a total of 14,931 needles in the needle loom 22 that provides 4,266 needles per meter. The needle is size is 0.858 millimeters in diameter on a 32 gauge machine. The combination 20 is needled at a rate of 3.64 meters per minute and then taken up on roll 24.

Referring now to FIG. 2, the combination 20 now on roll 12 is combined with another layer of 6 denier, 100% interentangled polypropylene fibers 7 on roll 10 and then combined and transported by drive rolls 14 and 16. This second combination results in a final composite which is 0.375 inches thick.

This final composite 26 is again needled from top to bottom by needle loom 22 as previously described. The final composite 26 is then plasticized by going through an eight zone oven 28 with the first six zones at 380 degrees Fahrenheit and the last two zones at 200 degrees Fahrenheit. The rate of speed is 6.38 meters a minute and each zone is 3.4125 meters long. The composite 26 melts down to 0.231 inches, which is a 38 percent loss in thickness. It now has an internal honeycomb structure due to the melting or plasticizing as opposed to mere heatsetting.

The final composite 26 then goes through a single blade chopping device 30 before being stacked in a pile 32.

EXAMPLE 2

As shown in FIG. 1, a roll 10 of one hundred percent polypropylene fibers that is an interentangled, non-woven, non-knitted layer 8 of 15 denier, 10 ounces per square yard, 0.078125 inches thick with 3 to 4 inch fiber length and is combined by means of drive rolls 14 and 16 with a non-woven blend of 80% nylon and 20% polypropylene fibers 6 on roll 12 that is 0.25 inches thick that was previously needled upon a 100% polypropylene scrim 45 which was woven to form a mesh. This scrim 45 weighs 2.5 ounces per square yard. This combination 20 is needled by a total of 14,931 needles in the needle loom that provides 4,266 needles per meter. The needle is 0.858 millimeters in diameter on a 32 gauge machine. The combination 20 is needled at a rate of 3.64 meters per minute and then taken up on roll 24.

Referring now to FIG. 2, the combination 20 now on roll 12 is combined with another layer of 15 denier, 100% interentangled polypropylene fibers 7 on roll 10 and then combined and transported by drive rolls 14 and 16. This second combination results in a final composite which is 0.4062 inches thick.

This final composite 26 is again needled from top to bottom by needle loom 22 as previously described. The final composite 26 is then plasticized by going through an eight zone oven 28 with the first six zones at 380 degrees Fahrenheit and the last two zones at 200 degrees Fahrenheit. The rate of speed is 6.38 meters a minute and each zone is 3.4125 meters long. The composite 26 melts down to 0.250 inches, which is a 38 percent loss in thickness. It now has an internal honeycomb structure due to the melting or plasticizing as opposed to mere heat-setting.

The final composite 26 then goes through a single blade chopping device 30 before being stacked in a pile 32.

Therefore, it is not intended that the scope of the invention be limited to the specific embodiments illustrated and described. Rather, it is intended that the scope of the invention be defined by the appended claims and their equivalents.

What is claimed is:

1. A method for manufacturing a rigid fiber composite material comprising:
    (a) needling a three layer composite including a non-woven blend of first fibers and second fibers that is interposed between two interentangled, non-woven layers of the first fibers so that elongate pieces of said two interentangled, non-woven layers of the first fibers are driven into said non-woven blend, said first fibers having a first melting point, said second fibers having a second melting point which is higher than said first melting point, said first fibers comprising greater than ten percent of said non-woven blend; and
    (b) heating said three layer composite to a level above melting point of the first fibers thereby forming a plasticized structure and then cooling resulting in the solidification of the two interentangled, non-woven layers of the first fibers and said elongate pieces, said solidification occurring without molding under pressure, heat setting or calendering.

2. The method according to claim 1, wherein said first fibers are polypropylene.

3. The method according to claim 1, wherein said first fibers are polyethylene.

4. The method according to claim 1, wherein said second fibers are nylon.

5. The method according to claim 1, wherein said second fibers are cotton.

6. The method according to claim 1, wherein said second fibers are polyester.

7. The method according to claim 1, wherein said second fibers are modacrylic.

8. The method according to claim 1, wherein said second fibers are fiberglass.

9. The method according to claim 1, wherein said three layer composite is needled from both the top and bottom.

10. The method according to claim 1, wherein said three layer composite is heated from between 375 to 415 degrees Fahrenheit.

11. The method according to claim 1, wherein said three layer composite is heated from between 380 to 400 degrees Fahrenheit.

12. The method according to claim 1, wherein said three layer composite is needled between 1 and 400 needles per centimeter.

13. The method according to claim 1, wherein said three layer composite is needled between 10 and 300 needles per centimeter.

14. The method according to claim 1, wherein said three layer composite is needled between 15 and 200 needles per centimeter.

15. The method according to claim 1, wherein said three layer composite is needled between 20 and 60 needles per centimeter.

16. The method according to claim 1, wherein said three layer composite is needled with a needle that is between 0.638 and 2.11 millimeters in diameter.

17. The method according to claim 1, wherein said three layer composite is needled with a needle that is between 0.638 and 1.83 millimeters in diameter.

18. The method according to claim 1, wherein said three layer composite is needled with a needle that is between 0.858 and 1.83 millimeters in diameter.

19. The method according to claim 1, wherein a decorative layer of material is flame laminated onto said three layer composite.

20. The method according to claim 19, wherein said decorative layer of material is a textile material with a foam backing.

21. The method according to claim 20, wherein said textile material is a raschel knit fabric.

22. The method according to claim 20, wherein said foam backing is a polyether.

23. The method according to claim 1, wherein said non-woven blend is attached to a woven layer of said first fibers.

* * * * *